United States Patent [19]
Ferguson

[11] 3,963,118
[45] June 15, 1976

[54] FERTILIZER COMPOSITION CONTAINING FERROUS SALT

[75] Inventor: Fred Eugene Ferguson, Marysville, Ohio

[73] Assignee: O. M. Scott & Sons Company, Marysville, Ohio

[22] Filed: Oct. 31, 1974

[21] Appl. No.: 519,422

[52] U.S. Cl. .............................. 206/84; 229/3.1; 229/3.5 MF; 71/28; 71/63; 71/64 E; 252/194
[51] Int. Cl.$^2$ ................... B65D 81/00; B65D 5/00; C05C 9/00
[58] Field of Search ............................... 71/28–30, 71/1, 53, 63, 64 E, 64 F; 252/184, 194, 385; 229/3.1, 3.5 MF; 206/84

[56]  References Cited
UNITED STATES PATENTS

| 3,311,564 | 3/1967 | Cline | 252/194 |
| 3,867,124 | 2/1975 | Church | 71/28 X |

FOREIGN PATENTS OR APPLICATIONS

| 280,934 | 2/1929 | United Kingdom | 252/194 |

*Primary Examiner*—Charles N. Hart
*Assistant Examiner*—Ferris H. Lander
*Attorney, Agent, or Firm*—J. B. Raden; H. J. Holt

[57]  ABSTRACT

The pick-up of free moisture by particulate fertilizer compositions containing a ferrous salt is reduced by the addition to the compositions of relatively small amounts of anhydrous magnesium sulfate.

10 Claims, No Drawings

FERTILIZER COMPOSITION CONTAINING FERROUS SALT

This invention relates to particulate fertilizer compositions containing a ferrous salt, to a method for the reduction of the pick-up of free moisture content in such compositions and to a packaged fertilizer of enhanced storage life.

Fertilizers frequently contain ferrous salts for combating chlorosis in vegetation in iron-deficient soils. However, the addition of ferrous salts to particulate or granular fertilizers frequently results in the pick-up by the compositions of excessive quantities of moisture. The fertilizers often become so moisture-laden that they are impossible to apply with drop or rotary spreaders. The utility of such fertilizers is as a result considerably impaired.

A number of techniques for avoiding the moisture build-up problem have been attempted but tests have proven them to be partially or wholly unsuccessful. One possibility, more effective sealing of the fertilizer packages, is inadequate because, even without the entry of outside moisture, the release of hydrated water already present in the fertilizer is frequently sufficient to create a free moisture problem. This becomes apparent when it is realized that ferrous ammonium sulfate, for example, a salt frequently used with granular turf fertilizers, may have as many as six molecules of chemically bound water of hydrate per each ferrous salt molecule. A second possible expedient is the substitution of other ferrous salts, as for example, anhydrous ferrous salts. But cost considerations preclude the use of most such salts and many are commercially unavailable. An additional possibility is the use of desiccants, absorbents or other additives which reduce free moisture content. But such additives have been found to be ineffective in quantities that are economically feasible.

It is accordingly a primary object of the present invention to provide a particulate fertilizer composition containing a ferrous salt which has considerably reduced susceptibility to moisture pick-up. It is an additional object of the invention to provide such a composition without impairing the other qualities or the effectiveness of the fertilizer.

It is another object of this invention to provide a packaged fertilizer composition of considerably enhanced storage life.

It is still an additional object of the invention to provide a process for accomplishing the foregoing results.

It has been found that the foregoing objects may be achieved by the addition to the fertilizer composition containing the ferrous salt of anhydrous magnesium sulfate in an amount sufficient to tie up the water of hydration of the ferrous salt. Specifically, the addition of from 0.5 to 10% by weight, based upon the total weight of the fertilizer composition, of anhydrous magnesium sulfate has been found to extend by more than three times the storage life of the fertilizers.

The mechanism of free moisture pick-up with ferrous salts is believed to occur by the oxidation of the ferrous salt to the ferric form. The ferric compound is much more acidic than the ferrous salt and, rather than giving up the water of hydration of the ferrous salt, bonds with the hydroxyl groups of the water molecule and releases protons. The proton is quite hygroscopic and bonds to additional moisture either in the air or in the fertilizer itself. This tends to explain the tendency of the fertilizer composition to become wet not only from the release of water of hydration but also from air moisture. Moreover, as the oxidation proceeds, the pH of the composition is reduced and this tends to protonate an amino group on any free urea present in the fertilizer. This in turn aggravates the moisture pick-up problem.

The foregoing would appear to indicate that the moisture problem should be reduced by preventing the ferrous to ferric ion oxidation reaction. However, the use of known reducing agents, antioxidants, water barrier coatings, desiccants or molecular sieves have proven either ineffective, or partially effective, at best. Tests under high temperature/humidity conditions have demonstrated that anhydrous magnesium sulfate has a singularly effective ability to reduce the moisture pick-up problem.

In a further aspect of this invention, the composition containing the anhydrous magnesium sulfate is sealed in a water vapor impervious package. This acts as a barrier to the entrance of outside moisture and is preferred particularly with compositions in which the ferrous salts have high contents of water of hydration. The reason for this is that the magnesium sulfate is normally added in an amount slightly in excess of an amount sufficient to tie up the waters of hydrate of the ferrous salt. The entrance of outside moisture would overwhelm the magnesium sulfate at the quantities used. A heat-sealed aluminum foil or other well known vapor barrier package may therefor be used to avoid the introduction of outside moisture.

The following examples illustrate the practice of the invention. Unless otherwise indicated, all parts are by weight.

EXAMPLE 1

A fertilizer composition was prepared from the following formulation:

| | |
|---|---|
| Fertilizer | 5230 gms. |
| FAS·6H$_2$O | 866 gms. |
| MgSO$_4$ (anhydrous) | 179 gms. |
| Sticking Agent | 830 ml. |

The fertilizer contained a foamed urea-formaldehyde resin, having a U/F molar ratio of 2.00/1.0. The formulation was sufficient for covering 5000 sq. ft. of turf with the equivalent of 2 lbs/acre of iron and 0.9 lbs/1000 sq. ft. of nitrogen. The fertilizer and its method of preparation are more fully disclosed in U.S. Pat. Nos. 3,231,363 and 3,705,794, both assigned to the present assignee, the disclosures of which are herein incorporated by reference. The sticking agent was Polyvis OSH, a polybutene polymer. The magnesium sulfate material was blended with the FAS.6H$_2$O (FeSO$_4$(NH$_4$)$_2$ SO$_4$·6H$_2$O). This mixture was fed into a blender containing the fertilizer and the dry mixture was adhered to the fertilizer. The fertilizer acts as both a nutrient source and a carrier, as more fully described in the aforesaid U.S. patents.

A series of tests were conducted in high temperature/high humidity chambers to determine the effectiveness of the compositions of the invention as well as the effectiveness of additives other than anhydrous MgSO$_4$. The most significant measure of the effectiveness of a formulation to reduce the moisture problem is the quantity of free water present. The free water, rather than the total water which includes bound water, is the most important contributing factor to the wetness of the fertilizer composition. By tying up the free water, the anhydrous $MgSO_4$ permits the fertilizer material to remain free flowing for a longer period of time through the spreader or applicator. The test accordingly compared the initial percentage of free water with the corresponding percentage after a given period of exposure to the high temperature/high humidity chamber. The composition of Example 1 was stored for 24 weeks in an aluminum foil sealed package at 38°C and 90% relative humidity. The same composition with anhydrous $MgSO_4$ was also stored in an aluminum foil sealed packaged at 38°C and 90% relative humidity. Storage of the composition without $MgSO_4$ was stopped after 16 weeks because the results were obviously ineffective. The free moisture contents initially and after storage are shown in Table I.

Table I

|  | Initial % Free Water | % Free Water After Storage |
|---|---|---|
| With $MgSO_4$ | 0.44 | 1.76 |
| Without $MgSO_4$ | 0.70 | 5.18 |

Thus, the compositions with anhydrous $MgSO_4$ contained after longer storage almost one third the percentage of free water as the same compositions without the additive.

In order to determine the consistency of the flow rate of the compositions through a spreader, flow rate tests were run with and without $MgSO_4$, both initially and after exposure to the humidity chambers. A drop spreader was adjusted at a setting of 5.5 lbs/1000 sq. ft. and successive flow rates were determined for each 97 revolutions of the spreader. Table II records the average of eight successive flow rates through the drop spreader of the fertilizer composition of Example 1 initially and after 24 weeks storage. The results are compared with equivalent tests on the same compositions without $MgSO_4$ after 16 weeks storage.

Table II

|  | Flow Rates (lbs/1000 sq. ft.) | |
|---|---|---|
|  | Initially | After Storage |
| With $MgSO_4$ | 2.5 | 2.3 |
| Without $MgSO_4$ | 2.2 | 1.0 |

The table II results indicate that flow through the spreader was acceptable with the compositions of the invention after 24 weeks of storage in the humidity chamber. The compositions without $MgSO_4$ had unacceptable flow rates after 16 weeks of storage.

Additional tests of free moisture content after varying storage periods in humidity chambers were run with the same fertilizer compositions containing additives other than $MgSO_4$. In these tests, the quantities of additives used were based both upon the calculated ability of the additive to absorb moisture and the necessary cost constraints of the final fertilizer product. The additives tested were hydrogel, anhydrous calcium sulfate, calcium silicate (Micro Cel E) and a molecular sieve. The molecular sieve was a synthetically produced metal alumino-silicate activated for water absorption by removal of water of hydration. All four of the materials tested are normally considered drying agents or dessicants. None of these materials provided acceptable free water levels or flow rates after storage of the test samples for from 15 to 20 weeks in the humidity chambers.

EXAMPLE 2

Tests were run of the following fertilizer with and without the addition of anhydrous $MgSO_4$:

| Fertilizer | 8336 gms |
|---|---|
| $FAS \cdot 6H_2O$ | 1735 gms |
| $MgSO_4$(anhydrous) | 470 gms |
| Sticking Agent | 1272 mls. |

The fertilizer contained foamed urea-formaldehyde resin, free urea, potassium sulfate and monoammonium phosphate. The results of these tests are set forth in Table III. Storage was for twelve weeks in the humidity chamber.

Table III

|  | % Free Water | |
|---|---|---|
| Additive (%) | Initial | After Storage |
| None | 0.10 | 4.86 |
| $MgSO_4$ | 0.05 | 2.30 |

As previously indicated, free urea contributes to the moisture problem. The results of Table III indicate that acceptable free moisture levels are obtained after storage with compositions containing both a ferrous salt and free urea.

The anhydrous magnesium sulfate used in the foregoing examples was calcined kieserite. This product is in the form of white granular crystals, readily dissolved in water. It contains about 96.98% $MgSO_4$ with less than 1.5% total water and has a molecular weight of 120.386. Any form of magnesium sulfate may be used as long as it is anhydrous, i.e. contains less than about 2 or 3% total water. It should be added to the composition in amounts generally ranging from about 0.5% to 10% by weight of the total weight of the composition. Normally from 1 to 5% will be used.

The fertilizer used in the foregoing examples was an expanded or foamed urea-formaldehyde reaction product. A considerable excess of the fertilizer was used, over five times the amount of the ferrous salt. The invention is however useful with any particulate fertilizer containing a ferrous salt which is subject to excessive free moisture content. The relative amounts of fertilizer can be widely varied depending on the nutrient requirements and the nutrient content of the specific fertilizer used. Many varieties of nitrogen, potassium and phosphorus-containing single or multiple component plant nutrients are normally applied in solid particulate form and therefor require relative freedom from excessive free moisture for proper flow properties through a spreader or other applicator. Illustrative of such fertilizers are urea, urea-formaldehyde, monoammonium and diammonium phosphate, potassium chloride, potassium sulfate, superphosphates and many other well known in the art.

There are a number of ferrous salts which, in addition to ferrous ammonium sulfate, are used as antichlorotic agents in particulate fertilizers. The invention is useful with any such ferrous salt containing waters of hydration. Illustrative of such ferrous sulfates, chlorides and nitrates, organic ferrous complexes such as the ferrous salts of hydroxy acids and the ferrous complexes of sodium, potassium and ammonium hydroxy acids.

The compositions of the invention may and frequently will contain numerous other additives in addition to the fertilizer component and the ferrous salt. Many such additional additives, including other sticking agents, are shown in the aforesaid U.S. Pat. Nos. 3,231,363 and 3,705,794. The compositions may, for example, include herbicides, fungicides, growth regulators, insecticides, spreaders, diluents and other additives well known in the fertilizer art.

I claim:

1. In a particulate fertilizer composition containing a ferrous salt selected from the group consisting of ferrous ammonium sulfate and hydrated ferrous sulfate and subject to the pick-up of excessive free moisture content therein, the improvement in which the composition contains anhydrous magnesium sulfate in an amount sufficient to tie up the waters of hydration of the ferrous salts.

2. The composition of claim 1 in which the ferrous salt is ferrous ammonium sulfate.

3. The composition of claim 1 in which the fertilizer comprises a urea-formaldehyde condensation product.

4. The composition of claim 3 in which the fertilizer also comprises urea.

5. The composition of claim 1 in which the composition contains from 0.5 to 10% by weight, based on the total weight of the composition, of anhydrous magnesium sulfate.

6. A process of reducing the pick-up of excessive free moisture in a particulate fertilizer composition containing a ferrous salt selected from the group consisting of ferrous ammonium sulfate and hydrated ferrous sulfate comprising adding to said composition anhydrous magnesium sulfate in an amount sufficient to tie up the water of hydration of the ferrous salt.

7. The process of claim 6 in which the composition contains from 0.5 to 10% by weight, based upon the total weight of the composition, of anhydrous magnesium sulfate.

8. A packaged particulate fertilizer composition of enhanced storage life containing a ferrous salt selected from the group consisting of ferrous ammonium sulfate and hydrated ferrous sulfate and subject to the pick-up of excessive free moisture content therein, said fertilizer composition being sealed in a water vapor impervious package, the fertilizer composition containing anhydrous magnesium sulfate in an amount sufficient to tie up the water of hydration of the ferrous salt.

9. The packaged fertilizer composition of claim 8 in which the ferrous salt is ferrous ammonium sulfate.

10. The packaged fertilizer composition of claim 8 in which the fertilizer comprises a urea-formaldehyde condensation product.

* * * * *